United States Patent
Ryo

(10) Patent No.: US 12,093,579 B2
(45) Date of Patent: Sep. 17, 2024

(54) IMAGE FORMING APPARATUS AND METHOD

(71) Applicant: CANON KABUSHIKI KAISHA, Tokyo (JP)

(72) Inventor: Cho Ryo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/107,186

(22) Filed: Feb. 8, 2023

(65) Prior Publication Data

US 2023/0251801 A1 Aug. 10, 2023

(30) Foreign Application Priority Data

Feb. 9, 2022 (JP) .................................. 2022-018844

(51) Int. Cl.
*G06F 3/12* (2006.01)
*G06K 15/02* (2006.01)

(52) U.S. Cl.
CPC .......... *G06F 3/1205* (2013.01); *G06F 3/1243* (2013.01); *G06F 3/1253* (2013.01); *G06K 15/024* (2013.01)

(58) Field of Classification Search
CPC .... G06F 3/1205; G06F 3/1243; G06F 3/1253; G06F 3/1204; G06F 3/1251; G06F 3/1285; G06K 15/024
See application file for complete search history.

(56) References Cited

U.S. PATENT DOCUMENTS

| 2014/0347693 A1* | 11/2014 | Matsuzawa ............ B41J 11/706 358/1.15 |
| 2019/0361646 A1* | 11/2019 | Hori .................... H04N 1/00456 |
| 2020/0293240 A1* | 9/2020 | Chew .................... G06F 3/1205 |

FOREIGN PATENT DOCUMENTS

JP 2018-202754 A 12/2018

* cited by examiner

*Primary Examiner* — Akwasi M Sarpong
*Assistant Examiner* — Michael L Burleson
(74) *Attorney, Agent, or Firm* — Venable LLP

(57) ABSTRACT

An image forming apparatus includes a setting unit configured to set a partition region for dividing a rolled print medium into a plurality of rolls, the partition region being set within a group of images that are sequentially printed accompanying feeding from a feeding apparatus in which the rolled print medium is set; and a printing unit configured to print, on the print medium fed from the feeding apparatus, the group of images reflecting the partition region set by the setting unit. The printing unit prints, on the partition region, an identification image indicating a cutting position for dividing into the plurality of rolls, and the setting unit sets a position at which the identification image is printed, based on information of the group of images.

13 Claims, 14 Drawing Sheets

| | JOB LIST | | | | | |
|---|---|---|---|---|---|---|
| DOCUMENT NAME | NUMBER OF PAGES | NUMBER OF COPIES | TYPE OF PAPER | NUMBER OF ROLLS | | |
| Document1 | 500 | 1 | PLAIN PAPER | 2 | DELETE | 302 |
| Document2 | 2 | 500 | MAT PAPER | 3 | | |
| Document3 | 5000 | 1 | GLOSSY PAPER | 2 | | |
| | | | | | PARTITION INFORMATION SETTING | 303 |
| | | | | | PRINT | 304 |

JOB LIST

| DOCUMENT NAME | NUMBER OF PAGES | NUMBER OF COPIES | TYPE OF PAPER | NUMBER OF ROLLS |
|---|---|---|---|---|
| Document1 | 500 | 1 | PLAIN PAPER | 2 |
| Document2 | 2 | 500 | MAT PAPER | 3 |
| Document3 | 5000 | 1 | GLOSSY PAPER | 2 |

- 301 (job list)
- 302 DELETE
- 303 PARTITION INFORMATION SETTING
- 304 PRINT

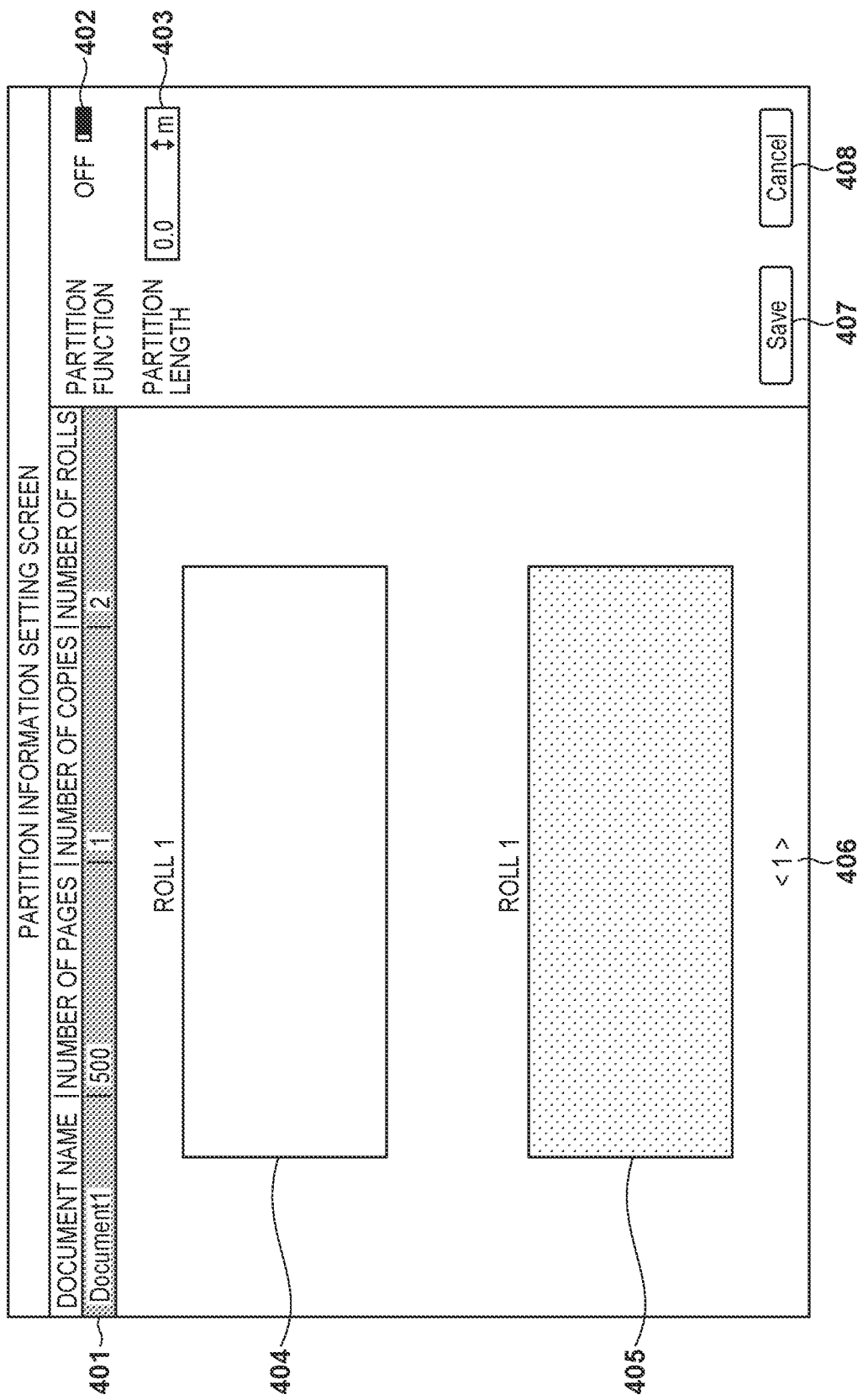

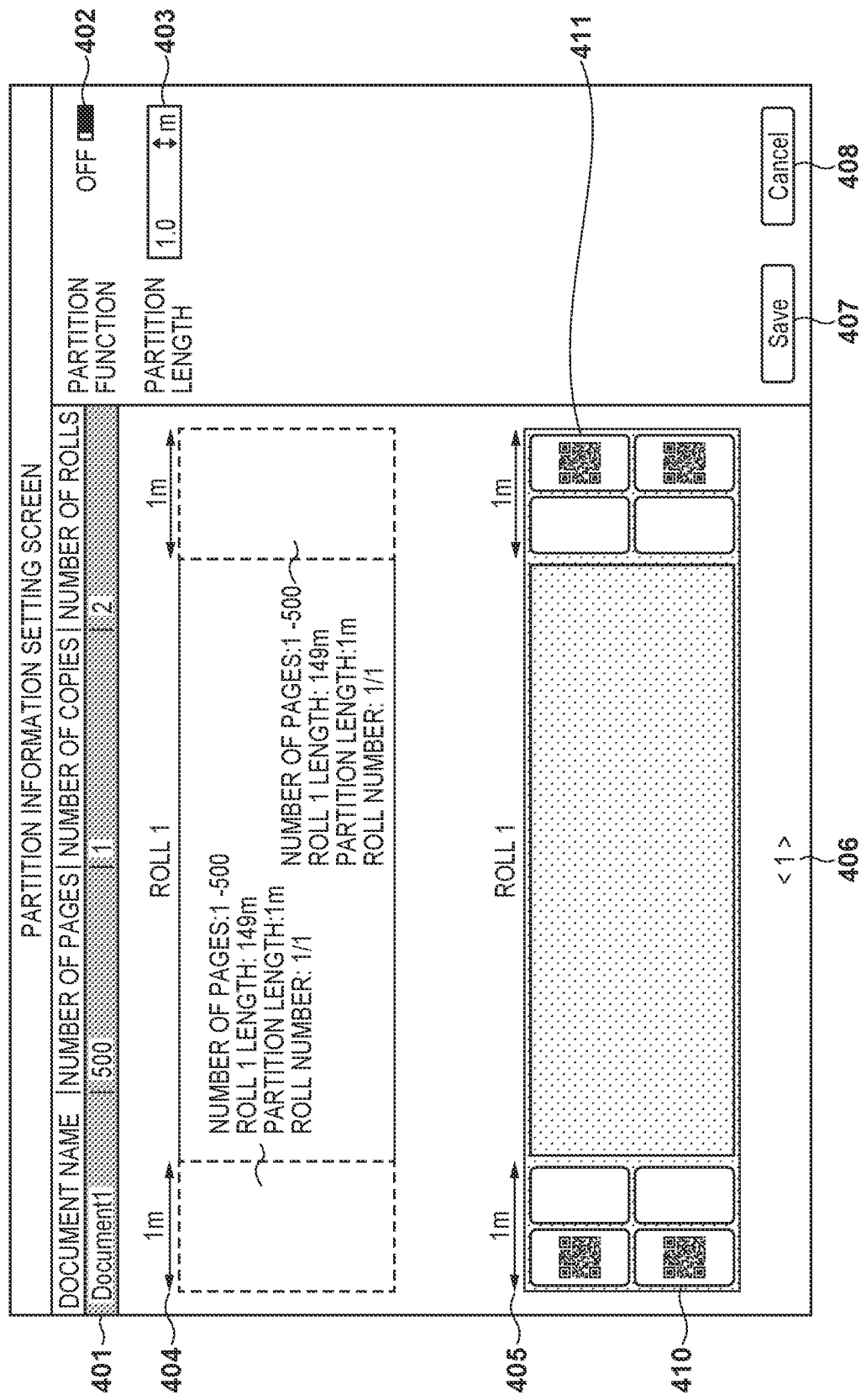

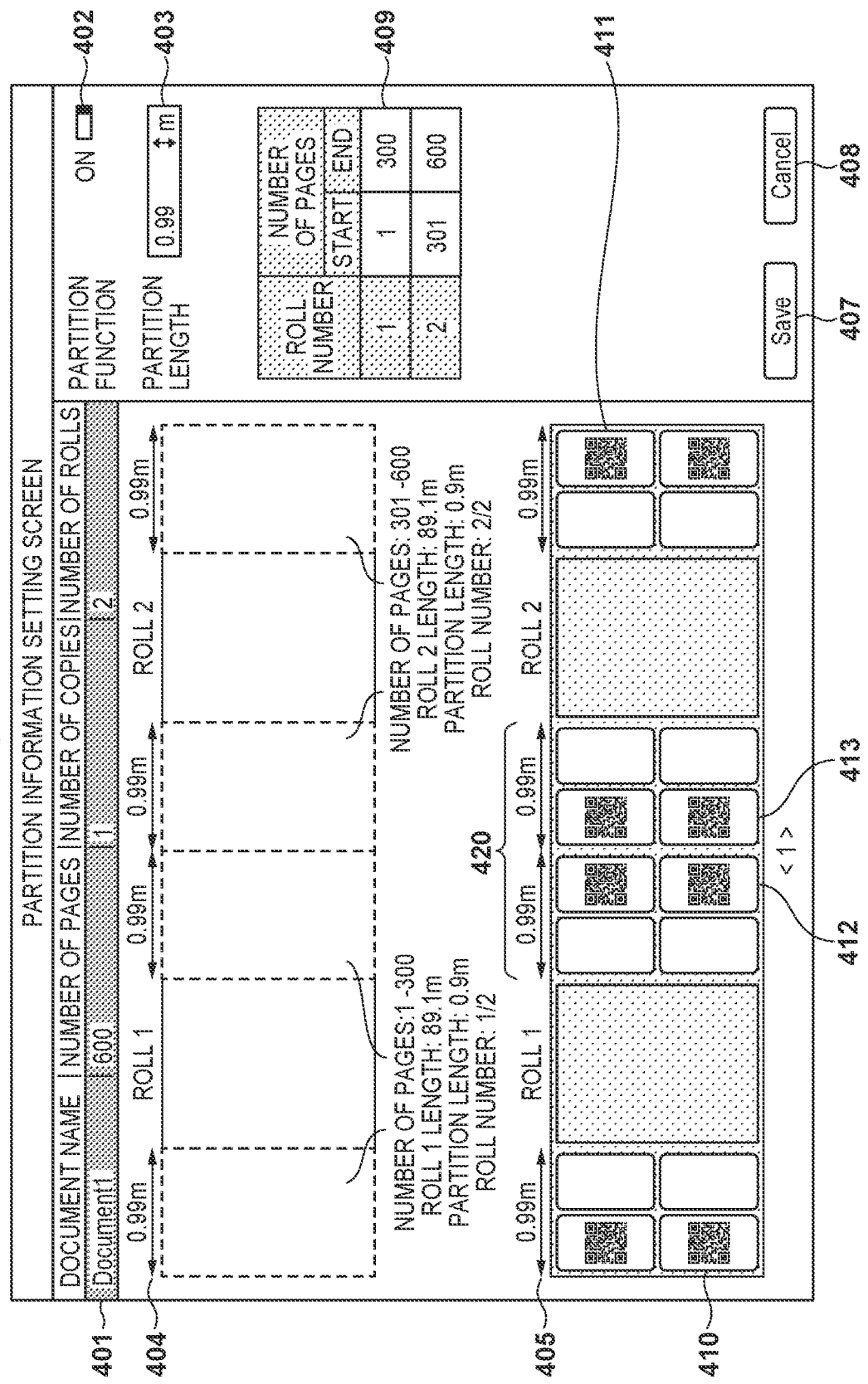

FIG. 11A
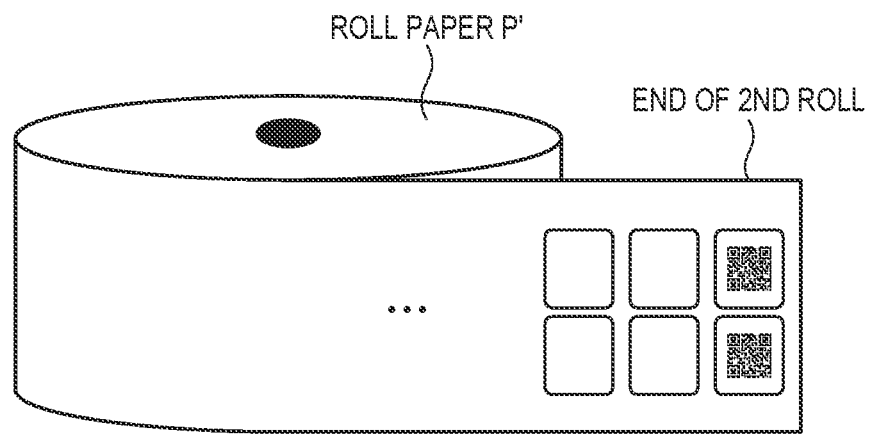
FIG. 11B
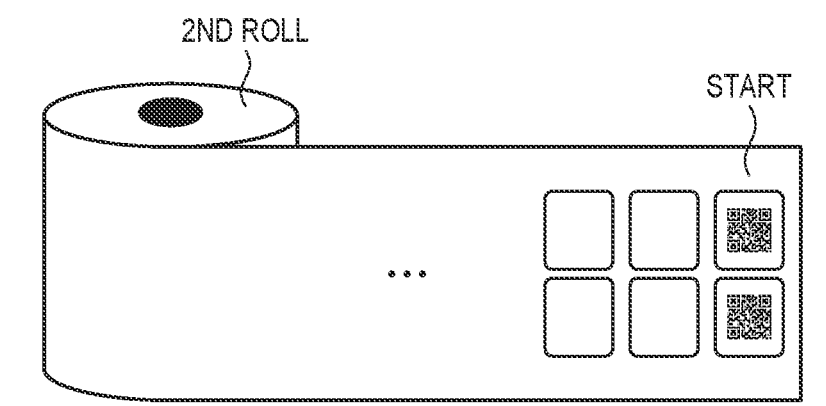
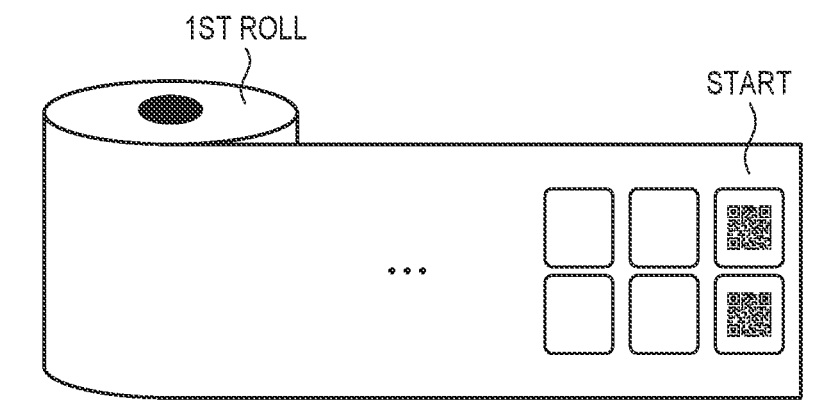

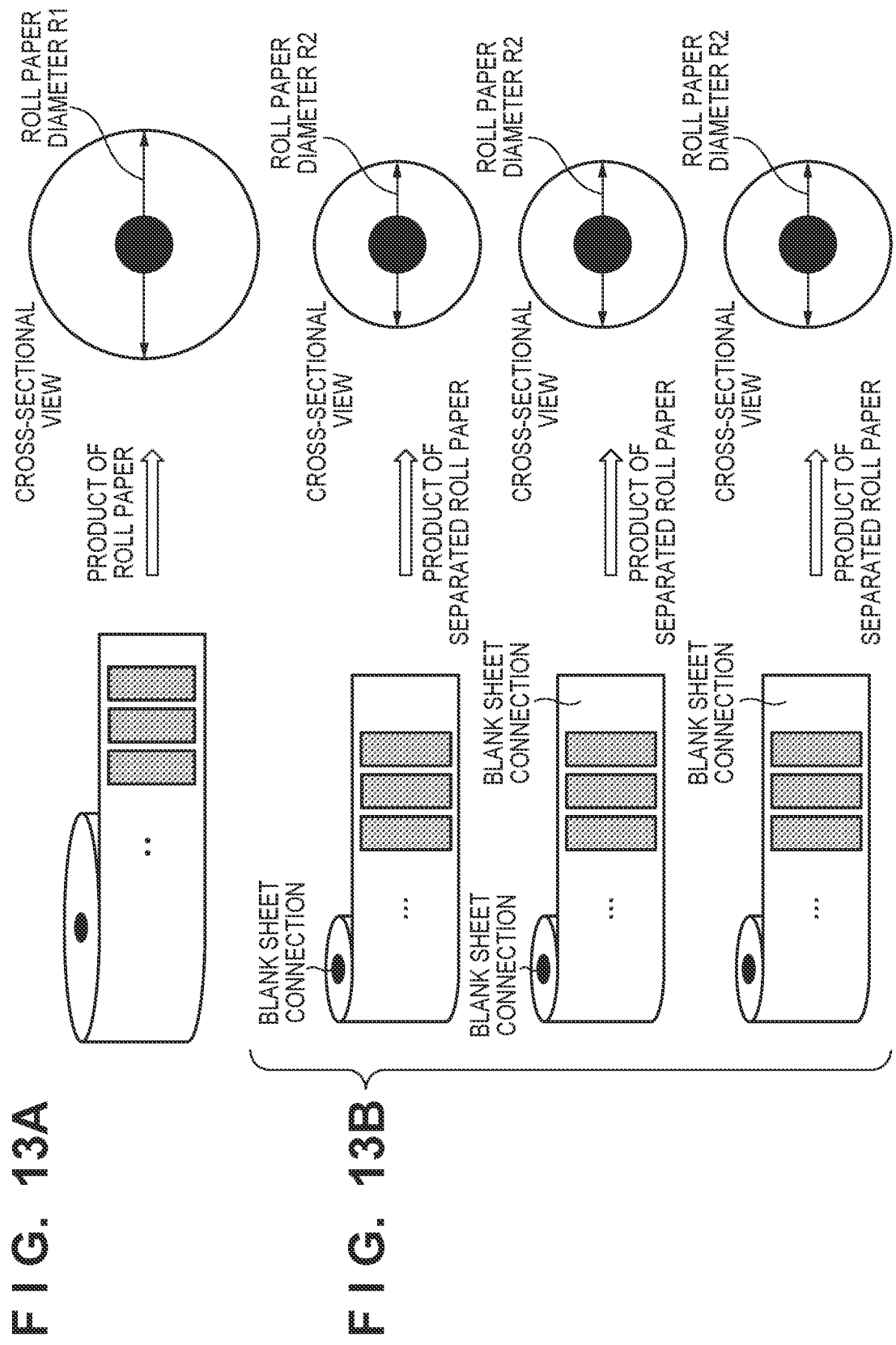

IMAGE FORMING APPARATUS AND METHOD

BACKGROUND

Field of the Invention

The present disclosure relates to an image forming apparatus, configured to form an image on a rolled print medium, and a method.

Description of the Related Art

There is known a label finisher system such as a post-processing machine that can perform, for example, a series of processing from shape cutout to winding in one-pass. The label finisher system requires restrictions related to specifications such as maximum processable roll diameter, maximum weight, maximum length, or the like, of a roll sheet. For example, in a case of winding finish of a label roll sheet, restrictions related to an outer size of a delivery roll sheet is required such that the roll sheet fits the size that can be accommodated in a machine such as a labeling machine that performs automatic labeling.

In a label roll printing factory, on the other hand, there arises a task of separating the roll sheet product into a plurality of rolls before delivery, in accordance with a request provided from a user at the delivery site about the outer size and the number of rolls for delivery of the delivery roll sheet (quantity of delivery rolls).

For example, when a roll sheet product having an image formed thereon is delivered with no change, there is the risk that, as illustrated in FIG. 13A, a diameter R1 or the weight of the roll sheet will exceed the limit and the roll sheet will not be set in the automatic labeling machine. Therefore, the operator needs to separate the roll sheet product into a plurality of rolls before delivery, in accordance with the request about the outer size and the number of rolls for delivery of the delivery roll. For example, as illustrated in FIG. 13B, the operator separates the roll sheet product into three rolls each having a diameter of R2. In the separation task, the operator first measures the length and counts the number of labels to make the roll sheet product fit within the outer size limit of the delivery roll and cuts the roll sheet in order to separate a portion that will fit from the roll sheet product. Next, the operator connects a certain length of blank sheet such that the separated part of the roll sheet product or the cut-off part of the roll sheet product may be rewound around the paper tube. With respect to the roll sheet product thus delivered to the user at the delivery site, a post-processing machine performs shape cutout processing or the like on a part having a plurality of label images formed thereon.

Japanese Patent Laid-Open No. 2018-202754 describes reducing the generation of useless regions in cutting continuous paper by performing a printing process with an optimal job interval required for post-processing.

SUMMARY

There is a need for improving the convenience of the task of separating a roll sheet product into a plurality of rolls.

The present disclosure provides an image forming apparatus and a method that improve the convenience of the task of separating a product of a rolled print medium into a plurality of rolls.

The present disclosure in one aspect provides an image forming apparatus comprising: a setting unit configured to set a partition region for dividing a rolled print medium into a plurality of rolls, the partition region being set within a group of images that are sequentially printed accompanying feeding from a feeding apparatus in which a rolled print medium is set; and a printing unit configured to print, on the print medium fed from the feeding apparatus, the group of images reflecting the partition region set by the setting unit, wherein the printing unit prints, on the partition region, an identification image indicating a cutting position for dividing into the plurality of rolls, and the setting unit sets a position at which the identification image is printed, based on information of the group of images.

According to the present disclosure, it is possible to improve the convenience of the task of separating a product of rolled print medium into a plurality of rolls.

Further features of the present disclosure will become apparent from the following description of exemplary embodiments with reference to the attached drawings.

BRIEF DESCRIPTION OF THE DRAWINGS

FIG. 3 is a diagram illustrating a print setting screen of a job list:

FIG. 4A is a diagram illustrating a setting screen of partition information:

FIG. 4B is a diagram illustrating a setting screen of partition information;

FIG. 4C is a diagram illustrating a setting screen of partition information:

FIGS. 11A and 11B are diagrams illustrating a delivery product obtained by a cutting machine.

FIGS. 13A and 13B are diagrams for explaining a separation task.

DESCRIPTION OF THE EMBODIMENTS

Figure 1:
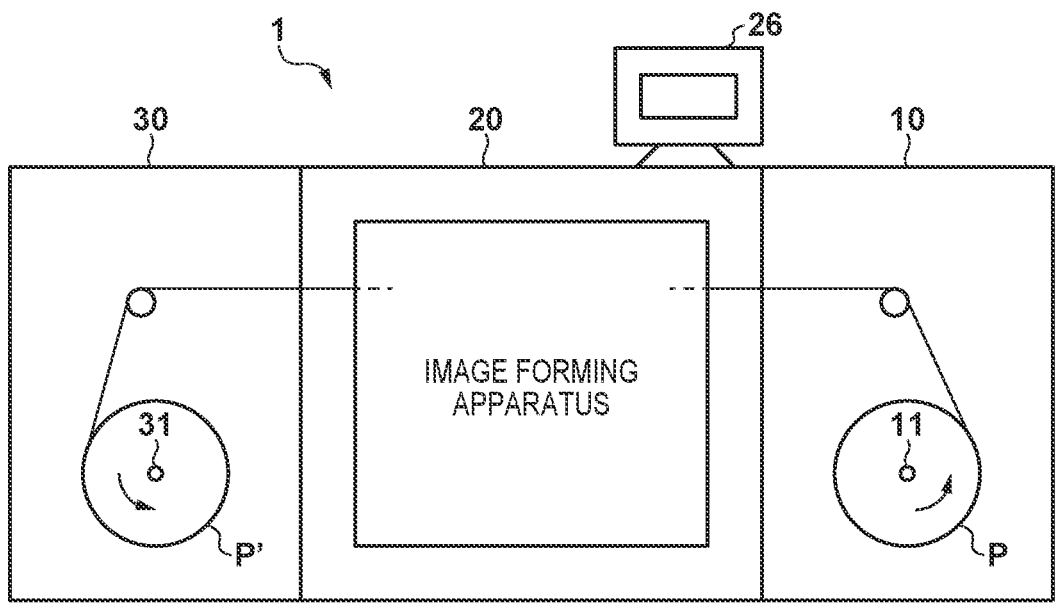
FIG. 1 is a diagram illustrating a schematic configuration of an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating an example of a schematic configuration of an image forming system 1 according to the present embodiment. The image forming system 1 is configured to form an image on a rolled print medium (referred to as roll sheet (continuous paper) below) P on which continuous image formation can be performed. The image forming system 1 is constituted by including a feeding apparatus 10, an image forming apparatus 20, and a winding apparatus 30 each connected from the upstream side along the conveyance direction of the roll sheet P in this order.

The feeding apparatus 10 is an apparatus configured to supply the roll sheet P to the image forming apparatus 20. The feeding apparatus 10 rotates a paper tube of the roll sheet P around a rotating shaft 11 as a center to convey the roll sheet P wound around the paper tube toward the image forming apparatus 20 at a constant speed through a plurality of rollers (e.g., a conveyance roller and a paper feed roller).

The image forming apparatus 20 performs a control to form an image on the roll sheet P supplied from the feeding apparatus 10. The image forming apparatus 20 conveys the roll sheet P having an image formed thereon toward the winding apparatus 30. In the present embodiment, the image forming apparatus 20 is a labeling apparatus configured to print, for example, a plurality of groups of labels (groups of images) continuously in the feed direction.

The winding apparatus 30 is an apparatus configured to wind the roll sheet P conveyed from the image forming apparatus 20 around a paper tube as a center into a roll shape. In the winding apparatus 30, the roll sheet P is wound around a paper tube of a rotating shaft 31 and held in a roll shape, as illustrated in FIG. 1, for example. The winding apparatus 30, by rotating around the rotating shaft 31 as a center, winds the roll sheet P, which is conveyed, around the paper tube, as a roll sheet product P' around the rotating shaft 31 at a constant speed through a plurality of rollers (e.g., a conveyance roller or a discharge roller).

Figure 12:
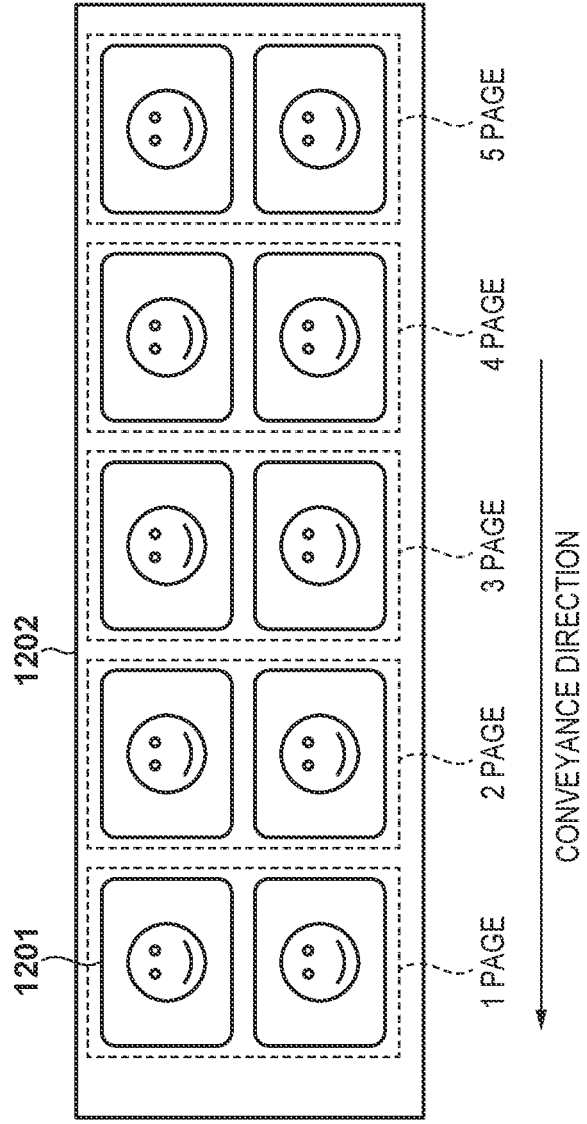
FIG. 12 is a diagram for explaining printing on a blank label.

The print medium for label printing (label roll sheet) includes a label part and a releasing part, for example. A generation method of the label product includes a method that prints on a label roll sheet and subsequently collects sheets of a releasing part at post-processing to generate the label product, and a method that preliminarily collects sheets of a releasing part from a yet-to-be printed roll sheet and prints on the remaining label region to generate the label product. In particular, a yet-to-be printed label in a state where sheets of a releasing part are preliminarily collected from the yet-to-be printed roll sheet is referred to as a blank label or a die-cut label. For example, FIG. 12 illustrates an example of printing on a blank label. A region 1201 indicates a label region, which is a region to be printed. FIG. 12 illustrates an exemplary layout of two labels in the width direction of a sheet. Although a page is defined as a region having two labels illustrated by a dotted line in the drawing, the embodiment is not limited to such a layout and each page may include four labels, for example. A region 1202 is an unprintable region referred to as a paper liner. As such, printing on a blank label eliminates the necessity of printing any pattern other than the printing product for adjustment at post-processing, which may lead to cost reduction. In addition, a user who does not have a post-processing machine can reduce the cost related to post-processing by using a roll sheet with sheets of the releasing part being preliminarily collected, but still needs to perform a separation task in accordance with the form of delivery. The present embodiment allows for improving the convenience of the aforementioned separation task that must be performed by the user.

Next, a control configuration of the image forming system 1 will be described in detail.

Figure 2:
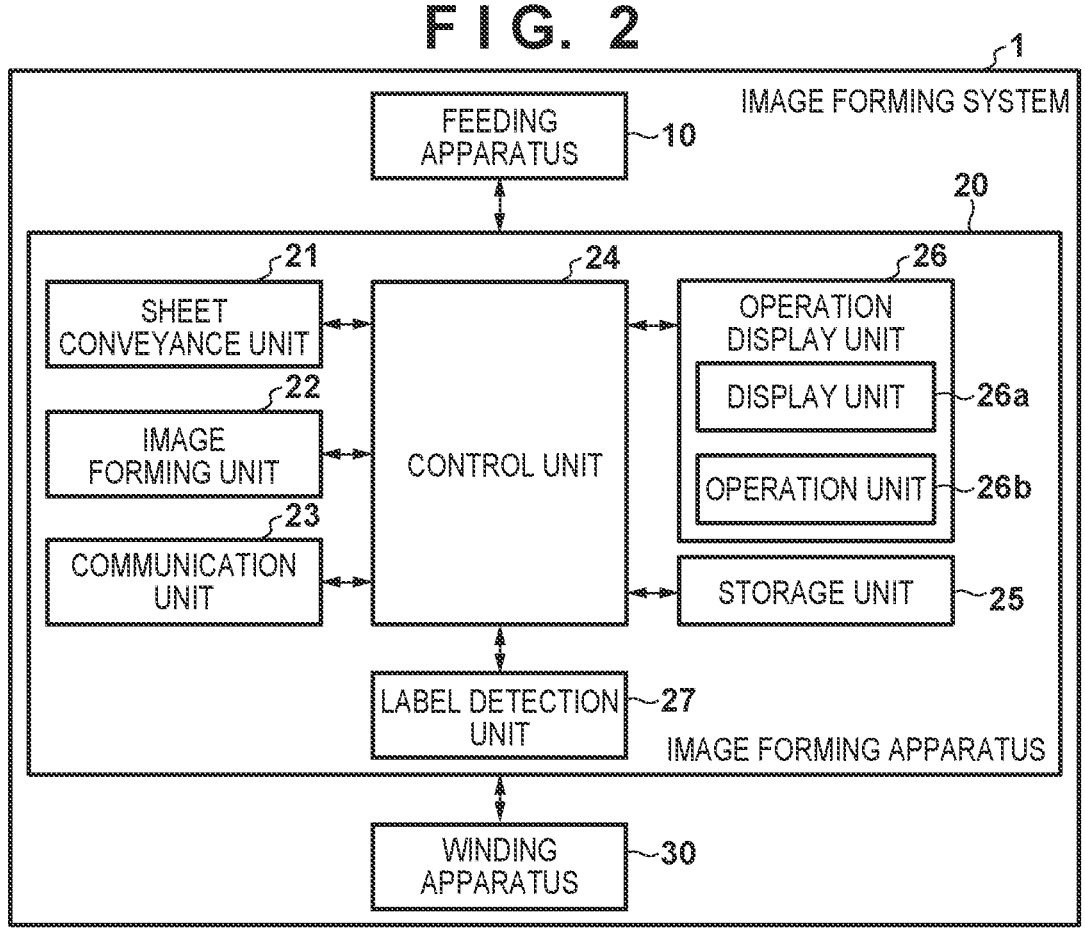
FIG. 2 is a functional block diagram illustrating a control configuration of the image forming system.

FIG. 2 is a functional block diagram illustrating a control configuration of the image forming system 1. FIG. 2 illustrates the feeding apparatus 10 and the winding apparatus 30 as external apparatuses. As illustrated in FIG. 2, the image forming apparatus 20 includes, for example, a sheet conveyance unit 21, an image forming unit 22, a communication unit 23, a control unit 24, a storage unit 25, an operation display unit 26, and a label detection unit 27. The units are communicably connected to each other via a bus or the like, for example.

The sheet conveyance unit 21 is a conveyance mechanism for the roll sheet P inside the image forming apparatus 20 that conveys, by a plurality of rollers, for example, the roll sheet P that has been conveyed from the feeding apparatus 10 to the image forming unit 22, and conveys the roll sheet P that has passed through the image forming unit 22 to the winding apparatus 30.

The image forming unit 22 forms an image on the roll sheet P supplied from the feeding apparatus 10, based on print data with which an output instruction is received. The roll sheet P having an image formed thereon by the image forming unit 22 is conveyed toward the winding apparatus 30. The communication unit 23 includes a communication control card such as a Local Area Network (LAN) card, for example. The communication unit 23 is configured to transmit and receive various types of data to and from an external apparatus (e.g., an information processing apparatus such as a PC) connected to a communication network such as a LAN, a Wide Area Network (WAN), or the like. Here, the communication network may be any of a wired network, a wireless network, or a network of a mixture of them.

The control unit 24 includes, for example, a Central Processing Unit (CPU), a Random Access Memory (RAM), or the like, and collectively controls the image forming system 1. The CPU of the control unit 24 reads out various programs such as system programs and processing programs stored in the storage unit 25, deploys them to the RAM, and executes various processes according to the deployed programs. For example, the control unit 24 can perform an image forming process that executes an image forming job (simply referred to as a job below) in accordance with the user's instruction. The storage unit 25 includes, for example, a non-volatile semiconductor memory (e.g., flash memory) or a Hard Disk Drive (HDD). The storage unit 25 has stored therein various programs such as system programs and processing programs to be executed by the control unit 24, and various types of data required to execute the programs.

The operation display unit 26, which is formed of a liquid crystal display (LCD) with a touch panel, for example, includes a display unit 26a and an operation unit 26b. The display unit 26a displays various types of information on a display screen in accordance with a display control signal input from the control unit 24. The operation unit 26b, including various types of operation keys such as a numeric keypad and a start key, accepts various input operations performed by the user, and outputs operation signals to the control unit 24. The operation display unit 26 is used for setting partition information in performing a job, for example.

Here, the partition information is information indicating an insertion position at which a partition information page is preliminarily inserted into the job, in a case where the roll sheet product P' subjected to the image forming process is needed to deliver in a manner separated into a plurality of rolls. In other words, preliminarily inserting the partition information into the job allows for reflecting the partition information page in the printed product. The insertion position information of the partition information page includes, for example, information of the number of pages in a roll, roll length information, partition length, and roll number information. In the present embodiment, the partition information is generated by using the number of pages to be printed, the number of labels to be printed, the printing length, or the like as a partition condition.

The label detection unit 27, which is an apparatus configured to detect a label region to be printed on a roll sheet, includes a light projecting unit such as a photoelectric sensor or a laser sensor, for example. The label detection unit 27 detects a label by detecting, for example, an edge between each label and the paper liner. In addition, the label detection unit 27 may be configured to detect a preliminarily printed mark for identifying a position.

Next, there will be described an operation of the image forming apparatus 20 when the image forming process is performed on the roll sheet P.

First, the user generates data for a job in an external apparatus such as a PC, and performs print setting of the job and setting of the number of rolls for delivery. Here, "number of rolls" in the present embodiment represents the number of delivery rolls. The data for a job and a job ticket including the information of the print setting of the job and setting of the number of rolls for delivery are transmitted to the image forming apparatus 20 via the communication network. The control unit 24 of the image forming apparatus 20 accepts the data for a job and the job ticket transmitted from the external apparatus via the communication unit 23.

FIG. 3 is a diagram illustrating an example of a print setting screen of a job list displayed on the display unit 26a by the control unit 24. As illustrated in FIG. 3, a display item 301 is a display list listing jobs that have been input. In the display item 301, job information or the like of jobs that have been input are listed in the order of input.

The job information includes, for example, a document name, number of pages, number of copies, type of paper, and number of rolls for delivery. In addition, the job information includes page size, layout information of blank labels (blank label transverse width, spacing between blank labels, or the like), although not illustrated in FIG. 3. Additionally, the user can select a job from those listed in the display item 301 by operating an operation key of the operation unit 26b. FIG. 3 illustrates a state where Document 1 is selected.

A display item 302 is a button that can accept an instruction to delete, from the storage unit 25, information of a job stored in the storage unit 25 which corresponds to the job selected in the display item 301. The display item 303 is a button that can accept an instruction to set partition information for the job selected in the display item 301. Pressing the display item 303 causes a setting screen of partition information to be displayed. The display item 304 is a button that can accept an instruction to start image formation of the job selected in the display item 301.

FIGS. 4A to 4C are diagrams each illustrating an example of a setting screen of partition information to be displayed on the display unit 26a by the control unit 24 when the display item 303 of FIG. 3 is pressed.

FIG. 4A illustrates an example of a setting screen of partition information in an off state of a partition information setting function. FIG. 4A illustrates default display information of the setting screen of partition information. As illustrated in FIG. 4A, job information of the selected job (Document 1) is displayed in a display item 401. The display item 402 is a control for instructing whether or not to perform the partition information setting function (referred to as "partitioning function" below) in the selected job, and FIG. 4A illustrates a case where the partitioning function is in an off state and then the job is printed in one-roll.

A display item 403 is a control for setting the length of a partition information page (referred to as partition length below). Setting of the partition length from the user can be accepted, and the default value of the partition length is 0.0 m. In a case of the default value 0.0 m, a partition information page is not generated.

A display item 404 is a screen that displays an image when the partition information set by the user is added to the job. A display item 405 is a print preview screen that displays an image of the print result in which the partition information page set by the user is added to the job.

A display item 406 is used for changing the page displayed on the preview screen. A display item 407 is a button that can accept an instruction to store the partition information and the partition information page, which are set by the user, in the storage unit 25. By pressing the display item 407, the partition information and the partition information page, which are set by the user, are stored in the storage unit 25. A display item 408 is a button for canceling the partition information and the partition information page which are set by the user. By pressing the display item 408, the partition information and the partition information page, which are set by the user, are cleared.

Figure 5:
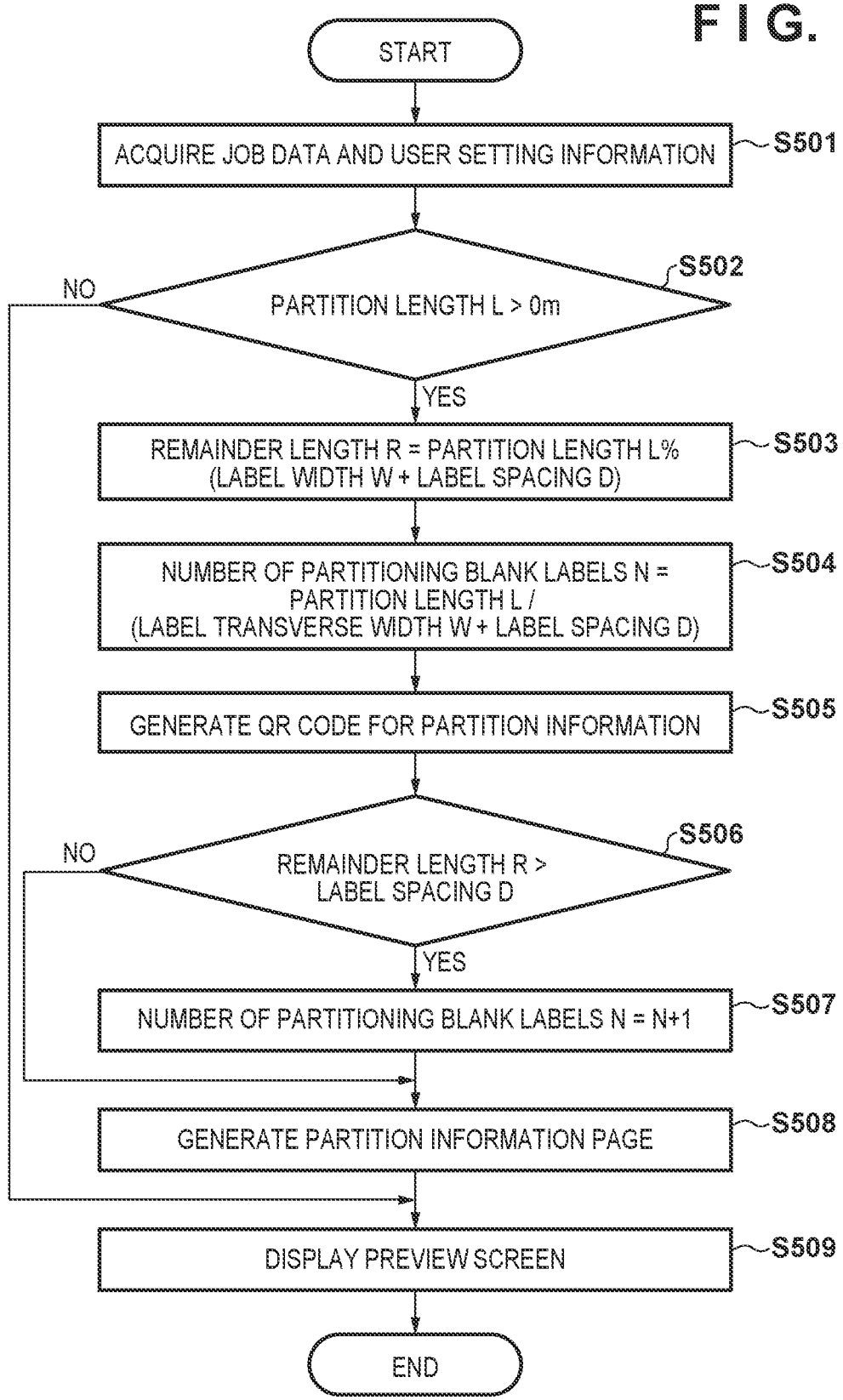
FIG. 5 is a flowchart illustrating a generation process of a partition information page.

In the following, there will be described a process of generating a partition information page in accordance with the user's setting. FIG. 5 is a flowchart illustrating a process of generating a partition information page in accordance with a user's setting. A function corresponding to the process illustrated in FIG. 5 is realized by executing a system program stored in the storage unit 25 by the CPU of the control unit 24. The process illustrated in FIG. 5 is started upon accepting, from the user, a setting of the partition length by the display item 403.

First, a case in FIG. 4A will be described, referring to FIG. 5.

At S501, the control unit 24 acquires job data of the display item 401 and setting information of the display item 402 and the display item 403.

At S502, the control unit 24 determines whether or not the partition length L is greater than 0 m. When, for example, the partition length L is set to 0 m as illustrated in FIG. 4A, the control unit 24 determines that the partition length L is not greater than 0 m and advances the process to S509.

At S509, the control unit 24 generates a preview of an image diagram in which the partition information page generated in accordance with the user's setting is added to the job. However, the partition length L is 0 m in the case of FIG. 4A, and therefore the partition information page is not generated. In the display item 404, an image is displayed for a case in which the job is one-roll without partition information. In the display item 405, an image is displayed for a case in which the job is one-roll without a partition information page. The difference between the display item 404 and the display item 405 will be described below.

Next, the case of FIG. 4B will be described, referring to FIG. 5.

FIG. 4B illustrates an example of a setting screen of partition information when the partition length is set in the display item 403 with the partition information setting function being in an off state. As indicated by the display item 402, the partition information setting function is in an off state, and therefore the job is printed in one-roll.

At S501, the control unit 24 acquires job data of the display item 401 and setting information of the display item 402 and the display item 403.

At S502, the control unit 24 determines whether or not the partition length L is greater than 0 m. When, for example, the partition length L is set to 1.0 m, as illustrated in FIG. 4B, the control unit 24 determines that the partition length L is greater than 0 m, and advances the process to S503.

Figure 6A:
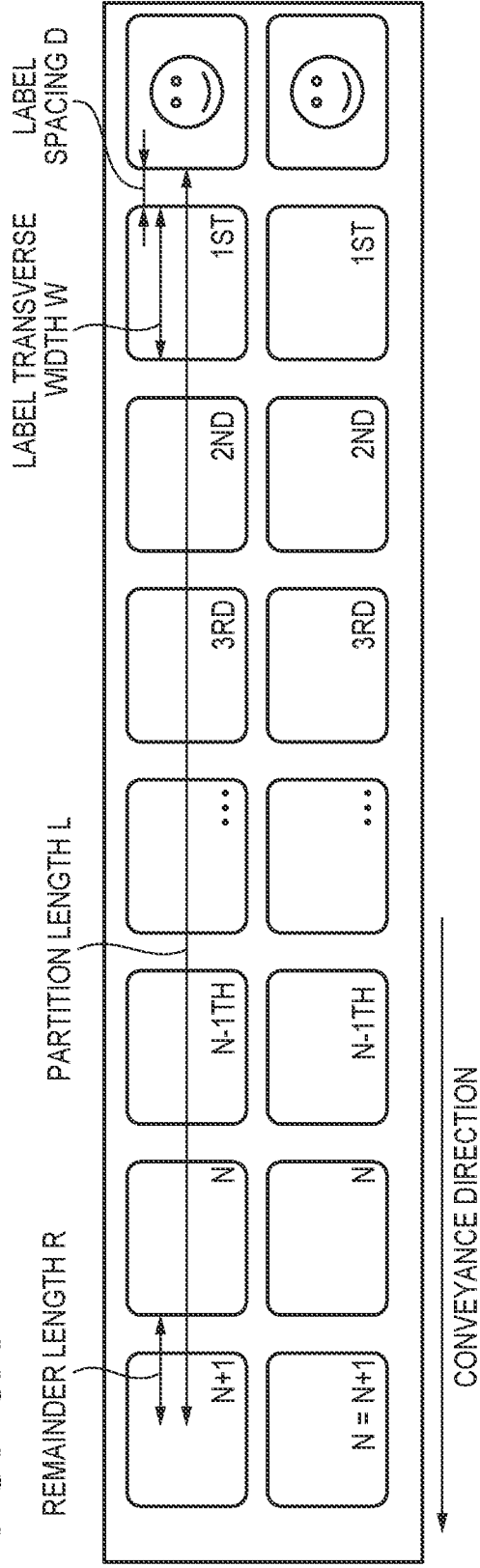
FIGS. 6A and 6B are diagrams illustrating a partition information page.

At S503, the control unit 24 acquires a remainder length R. As illustrated in FIG. 6A, the remainder length R is a length acquired by subtracting an integer multiple of the sum of a label transverse width W and a label spacing D from the partition length L, which is calculated by Equation (1).

$$\text{remainder length } R = \text{partition length } L \, \% \, (\text{label transverse width } W + \text{label spacing } D) \quad (1)$$

When, for example, the partition length L is 1.0 m, the label transverse width W is 2.7 cm, and the label spacing D is 3 mm, the remainder length R as a remainder calculated by Equation (1) is 10 mm.

At S504, the control unit 24 calculates the number of partitioning blank labels N with respect to the partition length L. As illustrated in FIG. 6A, the number of partitioning blank labels N is a quotient result of dividing the partition length L by the sum of the label transverse width W and the label spacing D, which is calculated by Equation (2).

$$\text{number of partitioning blank labels } N = \text{partition length } L / (\text{label transverse width } W + \text{label spacing } D) \quad (2)$$

For instance, the number of partitioning blank labels N calculated by Equation (2) is 30 in the aforementioned example.

At S505, the control unit 24 generates an identification image such as a QR code (trade name) indicating the partition information set by the user. For example, partition information such as number of pages in a roll, length of roll, partition length, and roll number information are generated as a QR code. Although a QR code is described in the following as an example of the identification image, a one-dimensional bar code, a mark or the like may also be used instead of a two-dimensional bar code, provided that it indicates the partition information. In addition, a character string or numbers that allow the user to visually recognize the content may be used instead of a coded image such as a QR code.

At S506, the control unit 24 determines whether or not the remainder length R calculated at S503 is greater than the label spacing D. When, for example, the remainder length R calculated by Equation (1) is greater than the label spacing D as illustrated in FIG. 6A, the control unit 24 advances the process to S507.

At S507, the control unit 24 increments, according to Equation (3), the number of partitioning blank labels N calculated by Equation (2).

$$\text{number of partitioning blank labels } N = \text{number of partitioning blank labels } N + 1 \quad (3)$$

For instance, the number of partitioning blank labels N calculated by Equation (3) in the aforementioned example is 31.

At S508, the control unit 24 generates a partition information page. The present embodiment generates a partition information page by generating N partitioning blank labels to be inserted at a leading end and an end point of each roll, and laying out the QR code generated at S505 at the N-th partitioning blank label to be inserted at the leading end and the end point. In other words, the QR code is laid out at a position corresponding to the arrangement of groups of labels in the partition information page.

For example, in the case of the aforementioned example, the partition information page is generated by inserting 31 partitioning blank labels at the leading end and the end point of a roll and laying out a QR code at the 31st partitioning blank label inserted at the leading end and the end point.

At S509, the control unit 24 generates a preview image indicating an image with the partition information page generated in accordance with the user's setting added to the job. For example, a preview image is displayed in the display item 404 together with partition information, as illustrated in FIG. 4B, in which the job is set to be one-roll and partition information pages of a case of 1.0 m are added to the leading end and the end point of a roll 1.

In the display item 405, a preview image is displayed which indicates an image with the job set to be one-roll and partition information pages of a case of 1.0 m being inserted at the leading end and the end point of the roll 1. In addition, the display item 410 indicates a QR code laid out at the 31st partitioning blank label inserted at the leading end of a roll 1. The display item 411 indicates a QR code laid out at the 31st partitioning blank label inserted at the end point of the roll 1. However, the number of partitioning blank labels is omitted in FIG. 4B due to limited space in the drawing.

Next, the case of FIG. 4C will be described, referring to FIG. 5.

FIG. 4C illustrates an example of a setting screen of partition information when the partition length is set with the partition information setting function in an on state. As indicated by the display item 402, the partition information setting function is in an on state, and therefore the job is printed in two rolls according to the setting. In addition, the text box of the display item 409 allows the user to specify the start page and the end page of each roll. As indicated by the display item 409, the first roll contains page 1 to page 300, and the second roll contains page 301 to page 600.

At S501, the control unit 24 acquires job data of the display item 401 and setting information of the display item 402 and the display item 403.

At S502, the control unit 24 determines whether or not the partition length L is greater than 0 m. When, for example, the partition length L is set to 0.9 m, as illustrated in FIG. 4C, the control unit 24 determines that the partition length L is greater than 0 m, and advances the process to S503.

At S503, the control unit 24 acquires the remainder length R. As illustrated in FIG. 6A, the remainder length R is a length acquired by subtracting an integer multiple of the sum of the label transverse width W and the label spacing D from the partition length L, which is calculated by Equation (1). Equation (1) is presented again in the following.

$$\text{remainder length } R = \text{partition length } L \, \% \, (\text{label transverse width } W + \text{label spacing } D)$$

When, for example, the partition length L is 0.99 m, the label transverse width W is 3 cm, and the label spacing D is 3 mm, the remainder length R calculated by Equation (1) is 0 mm.

Figure 6B:
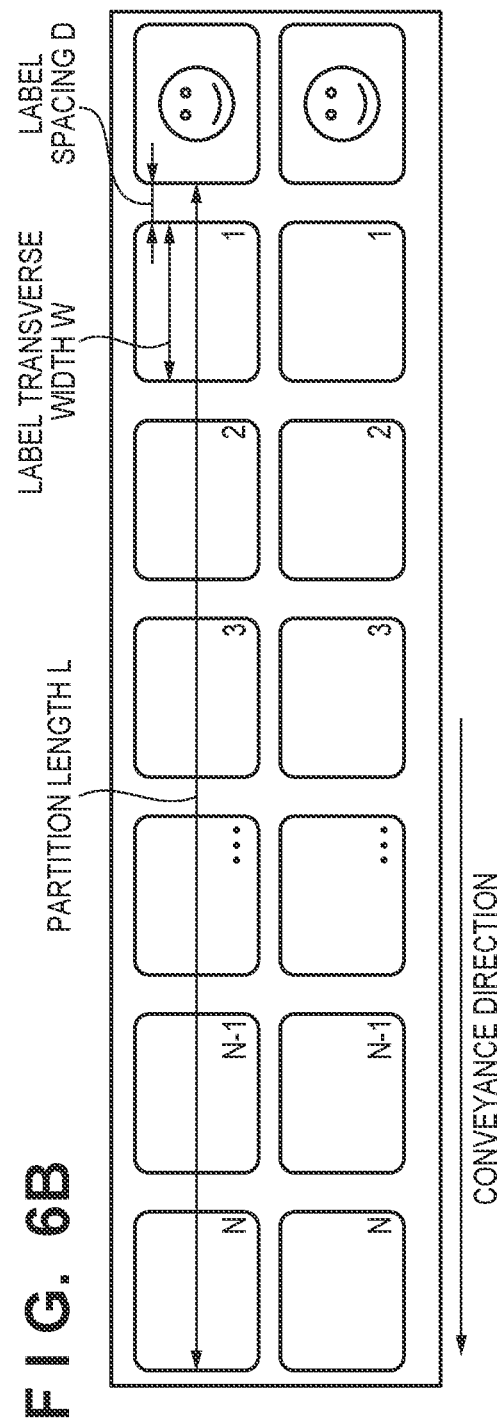

At S504, the control unit 24 calculates the number of partitioning blank labels N with respect to the partition length L. As illustrated in FIGS. 6A and 6B, the number of partitioning blank labels N is the quotient result of dividing the partition length L by the sum of the label transverse width W and the label spacing D, which is calculated by Equation (2). Equation (2) is presented again in the following.

$$\text{number of partitioning blank labels } N = \text{partition length } L / (\text{label transverse width } W + \text{label spacing } D)$$

For example, the number of partitioning blank labels N calculated by Equation (2) is 30 in the aforementioned example.

At S505, the control unit 24 generates a QR code indicating the partition information set by the user. For example, partition information such as number of pages in a roll, length of roll, partition length, and roll number information are generated as a QR code. Here, the partition information included in the QR code is not limited to the aforementioned information, provided that it allows determination of the amount of the roll sheet to be wound by a cutting machine 100 described below.

At S506, the control unit 24 determines whether or not the remainder length R calculated at S503 is greater than the label spacing D. When, for example, the remainder length R calculated by Equation (1) is smaller than the label spacing D as illustrated in FIG. 6B, the control unit 24 advances the process to S508.

At S508, the control unit 24 generates a partition information page. The present embodiment generates a partition information page by generating N partitioning blank labels to be inserted at the leading end and the end point of each roll, and laying out the QR code generated at S505 at the N-th partitioning blank label to be inserted at the leading end and the end point.

For instance, in the case of the aforementioned example, the partition information page is generated by inserting 30 partitioning blank labels at the leading end and the end point of each roll and laying out a QR code at the 30th partitioning blank label inserted at the leading end and the end point of each roll.

At S509, the control unit 24 generates a preview image indicating an image with the partition information page generated in accordance with the user's setting added to the job. For example, a preview image is displayed in the display item 404 together with partition information, as illustrated in FIG. 4C, in which the job is set to be two-roll and partition information pages of a case of 0.99 m are added to the leading end and the end point of each roll.

In the display item 405, a preview image is displayed which indicates an image with the job set to be two-roll and partition information pages of a case of 0.99 m being inserted at the leading end and the end point of each roll. In addition, the display item 410 indicates a QR code laid out at the 30th partitioning blank label inserted at the leading end of the roll 1. In addition, the display item 412 indicates a QR code laid out at the 30th partitioning blank label inserted at the end point of the roll 1. In addition, the display item 413 indicates a QR code laid out at the 30th partitioning blank label inserted at the leading end of a roll 2. The display item 411 indicates a QR code laid out at the 30th partitioning blank label inserted at the end point of the roll 2. However, the number of partitioning blank labels is omitted in FIG. 4C due to limited space in the drawing.

A region 420 of FIG. 4C indicates the partition region. As illustrated in FIG. 4C, the partition region is a region twice as large as the partition information page of each roll. In other words, the middle of the partition region is a cutting position to be cut by the cutting machine 100 described below. In the present embodiment, the QR code is printed in the vicinity of the cutting position of the partition region, as illustrated in FIG. 4C.

Figure 7:
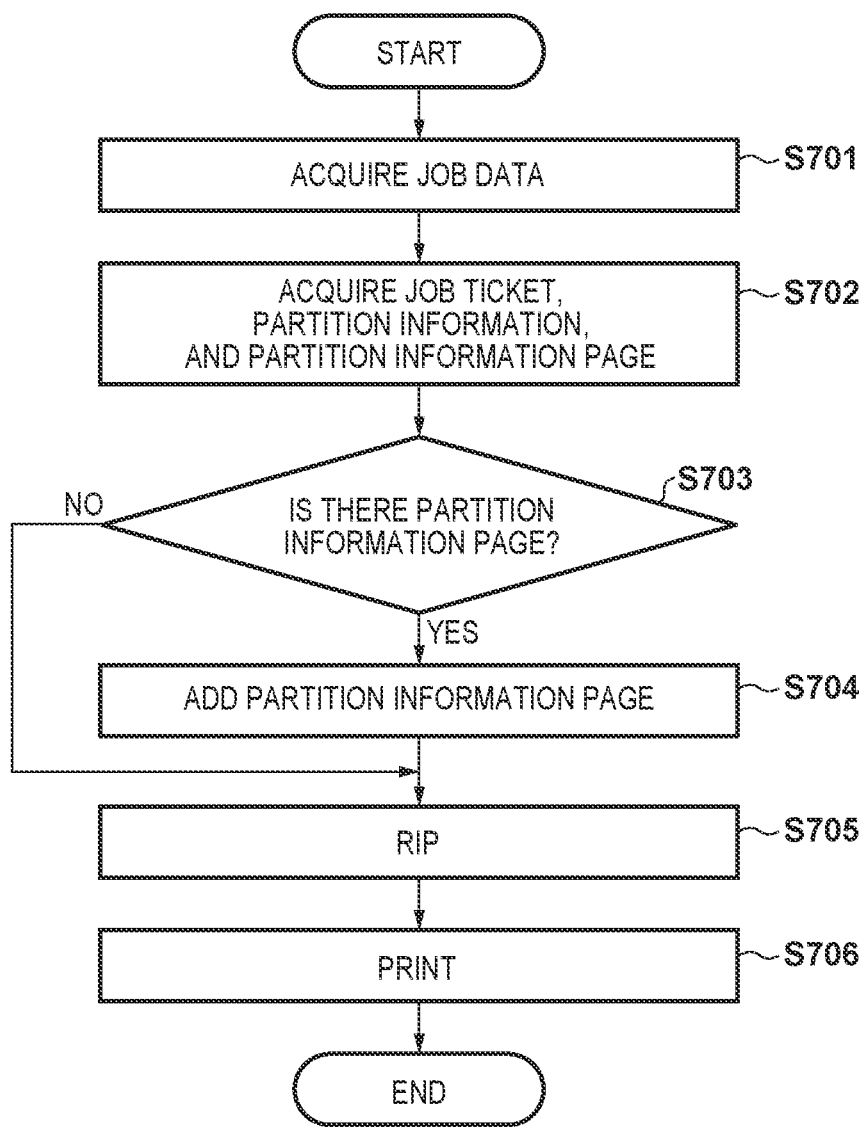
FIG. 7 is a flowchart illustrating a process of printing on a roll sheet.

FIG. 7 is a flowchart illustrating a process of performing printing on the roll sheet P. A function corresponding to the process illustrated in FIG. 7 is realized by executing a system program stored in the storage unit 25 by the CPU of the control unit 24. The process illustrated in FIG. 7 is started upon accepting a print instruction from the user by the display item 304.

At S701, the control unit 24 acquires job data of the job selected by the display item 301.

At S702, the control unit 24 acquires the job ticket of the job selected by the display item 301, and the partition information and the partition information page generated by the users setting.

At S703, the control unit 24 determines the presence or absence of a partition information page. When it is determined that there is no partition information page, the process proceeds to S705. When, on the other hand, it is determined that there is a partition information page, the process proceeds to S704.

Based on the partition information set by the user, the control unit 24 divides, at S704, the job into a plurality of rolls based on the start page and the end page of each roll included in the partition information, and adds the partition information page before and after each roll.

At S705, the control unit 24 performs a Raster Image Processing (RIP) on the job to generate image data for printing. The job here has no partition information page added when it is determined at S703 that there is no partition information page, or has a partition information page added when it is determined at S703 that there is a partition information page. At S706, the control unit 24 causes the image forming unit 22 to form an image on the roll sheet P based on the image data, and subsequently terminates the process illustrated in FIG. 7.

Figure 10:
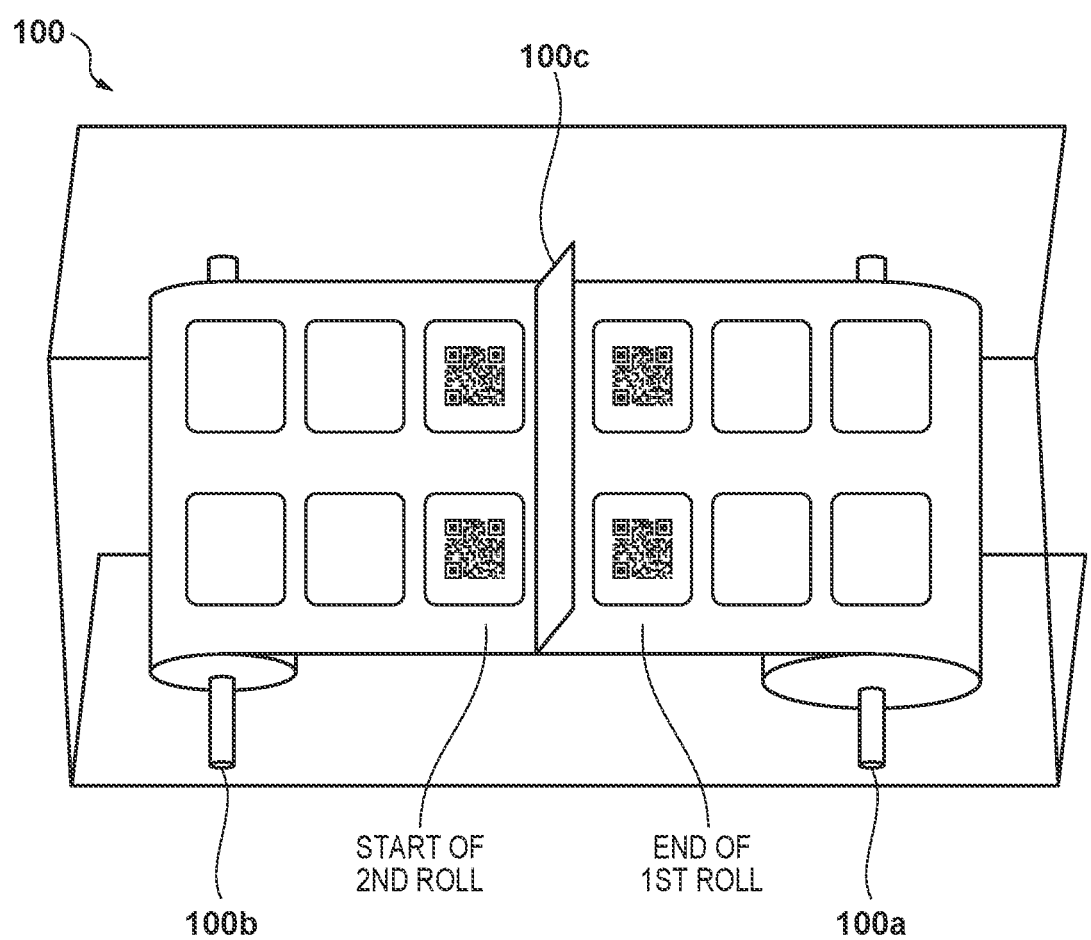
FIG. 10 is a diagram illustrating a cutting machine.

Next, there will be described an effect of the present embodiment in a case of performing printing by the image forming system 1 and temporarily winding the roll sheet P in the winding apparatus 30, and subsequently forming it into a delivery form. In such a case, the cutting machine 100 illustrated in FIG. 10 is used in addition to the image forming system 1.

The cutting machine 100 is an apparatus configured to adjust the length of the roll sheet P temporarily wound in the image forming system 1 to the length of the delivery form. The cutting machine 100 includes a sheet feeding unit 100a configured to set the roll sheet and feed the roll sheet, a winding unit 100b configured to wind the roll sheet being fed, and a cutter 100c configured to cut the roll sheet being fed at the end point of the roll into a form of a delivery product.

After setting the product P' illustrated in FIG. 11A to the sheet feeding unit 100a, the operator reads the QR code at the end point of the product P' with a QR code reader to acquire the roll length information of the first roll to be cut. Subsequently, the operator uses the winding unit 100b to wind the sheet as long as the roll length of the first roll acquired. By cutting at the middle between positions of the leading end of the second roll and the end point of the first roll using the cutter 100c as illustrated in FIG. 10, the first roll of the delivery product illustrated in FIG. 11B is obtained. The operator can obtain the second roll of the delivery product by performing a similar task on the rest of the product P'. Since a partition information page is added between rolls as illustrated in FIG. 10, the operator can easily recognize the cutting position. In addition, a task of connecting a blank sheet of related art is eliminated, so the workload of the operator can be reduced.

As such, in the image forming system, the operator can easily grasp the final delivery form, by adding partition information to a region that can be visually recognized in a state of being wound in a roll shape. In addition, by reading the QR code at the leading end of the delivery product with a QR code reader, as illustrated in FIG. 11B, the operator can easily acquire information of the length or the number of labels for each roll.

Second Embodiment

Figure 8:
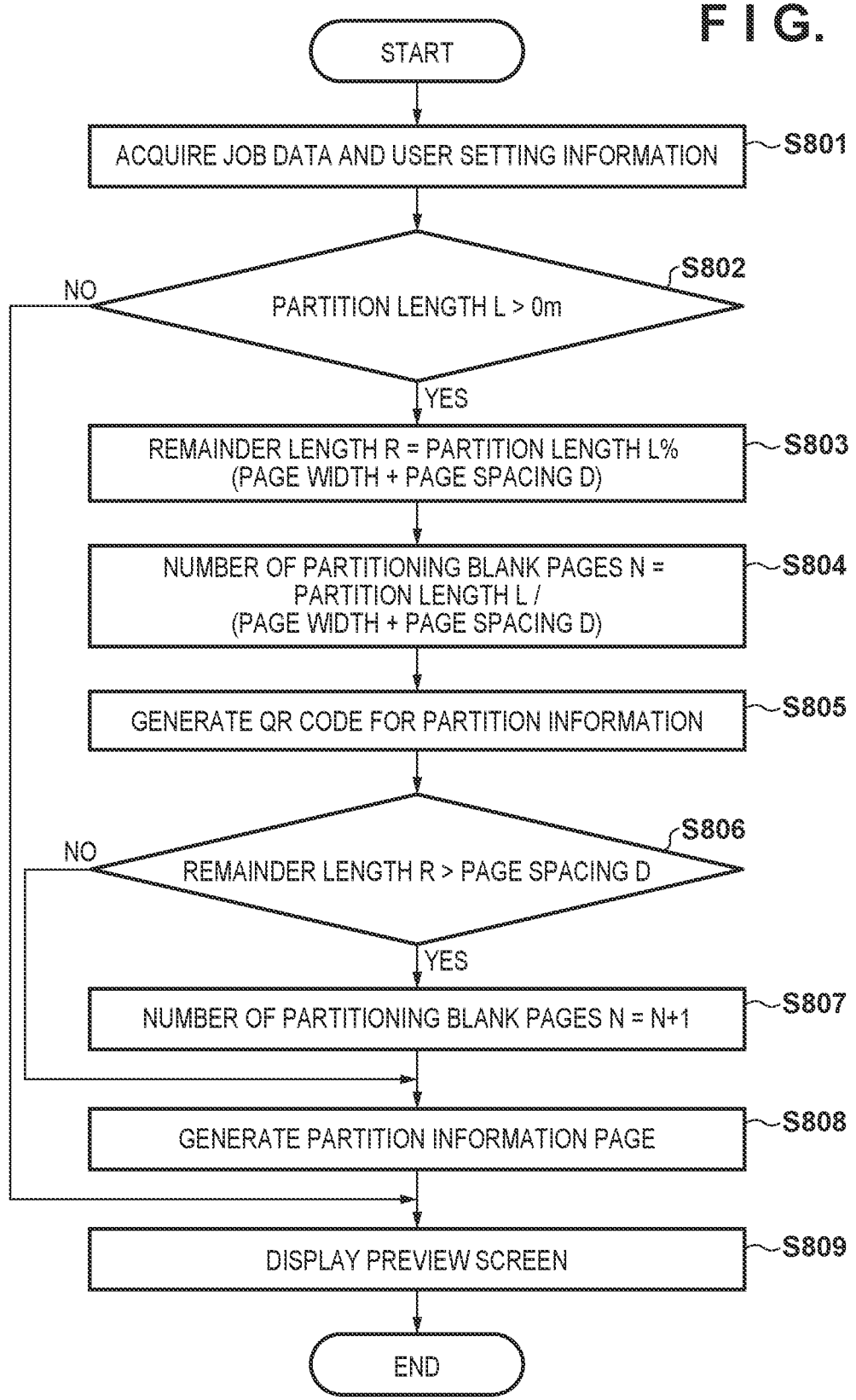
FIG. 8 is a flowchart illustrating a process of generating a partition information page.

In the following, a second embodiment will be described, focusing on the difference from the first embodiment. FIG. 8 is a flowchart illustrating a process of generating a partition information page in accordance with the user's setting, according to the present embodiment. A function corresponding to the process illustrated in FIG. 8 is realized by executing a system program stored in the storage unit 25 by the CPU of the control unit 24. The process illustrated in FIG. 8 is started upon accepting, from the user, a setting of the partition length by the display item 403. In the first embodiment, the remainder length R is calculated based on the partition length L and the layout information of blank labels. On the other hand, the remainder length R is calculated in the present embodiment based on the page size and the page spacing of the job entered. In the following, FIG. 8 will be described referring to the case of FIG. 4B.

In FIG. 8, S801, S802 and S809 are respectively similar to S501, S502 and S509 illustrated in FIG. 5 and therefore description thereof will be omitted. Note that, in the present embodiment, the page size and the page spacing are acquired from the job information included in the job data acquired at S501.

Since the partition length L is set to 1.0 m as illustrated in FIG. 4B, the control unit 24 determines that the partition length L is greater than 0 m, and advances the process to S803.

Figure 9:
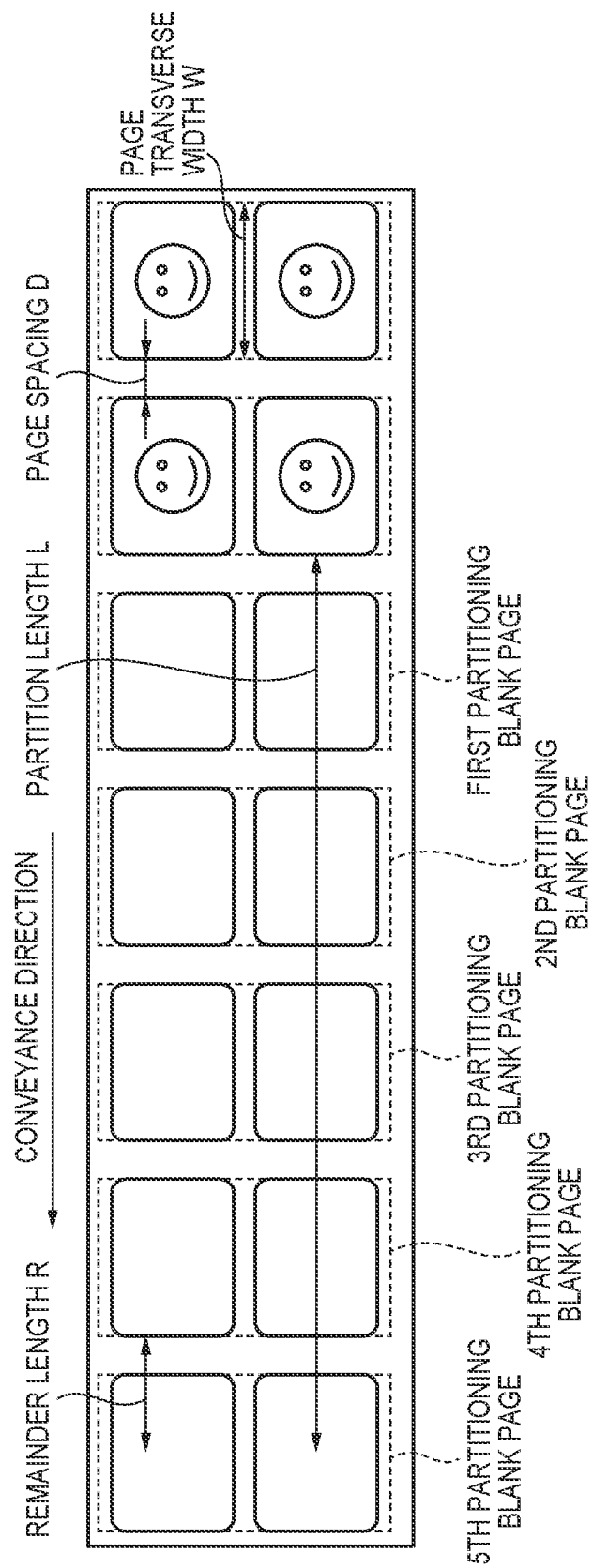
FIG. 9 is a diagram illustrating a partition information page.

At S803, the control unit 24 calculates the remainder length R. As illustrated in FIG. 9, the remainder length R is a length acquired by subtracting an integer multiple of the sum of the page transverse width W and the page spacing D from the partition length L, which is calculated by Equation (4).

$$\text{remainder length } R = \text{partition length } L \,\%\, (\text{page transverse width } W + \text{page spacing } D) \quad (4)$$

When, for example, the partition length L is 1.0 m, the page transverse width W is 210 mm, and the page spacing D is 2 mm, the remainder length R calculated as a remainder by Equation (4) is approximately 152 mm.

At S804, the control unit 24 calculates the number of partitioning blank pages N for the partition length L. As illustrated in FIG. 9, the number of partitioning blank pages N is the quotient result of dividing the partition length L by the sum of the page transverse width W and the page spacing D, which is calculated by Equation (5).

$$\text{number of partitioning blank pages } N = \text{partition length } L / (\text{page transverse width } W + \text{page spacing } D) \quad (5)$$

For instance, the number of partitioning blank pages N calculated by Equation (5) is 4 in the aforementioned example.

At S805, the control unit 24 generates a two-dimensional barcode such as a QR code indicating the partition information set by the user. For example, partition information such as number of pages in a roll, length of roll, partition length, and roll number information are generated as a QR code. Although a QR code is described in the following as an example, a one-dimensional bar code may also be used instead of a two-dimensional bar code, provided that it indicates the partition information.

At S806, the control unit 24 determines whether the remainder length R calculated at S803 is greater than the page spacing D. For example, when the remainder length R calculated by Equation (4) is greater than the page spacing D as illustrated in FIG. 9, the control unit 24 determines that the remainder length R is greater than the page spacing D, and advances the process to S807.

At S807, the control unit 24 increments, according to Equation (6), the number of partitioning blank pages N calculated by Equation (5).

$$\text{number of partitioning blank pages } N = \text{number of partitioning blank pages } N + 1 \quad (6)$$

For instance, in the case of the aforementioned example, the number of partitioning blank pages N calculated by Equation (6) is 5.

When, on the other hand, the remainder length R calculated by Equation (4) at S806 is smaller than the page spacing D, the control unit 24 determines that the remainder length R is not greater than the page spacing D, and advances the process to S808.

At S808, the partition information page is generated. The present embodiment generates a partition information page by generating N partitioning blank pages to be inserted at the leading end and the end point of each roll, and laying out the QR code generated at S805 at the N-th partitioning blank page to be inserted at the leading end and the end point. In other words, the QR code is laid out at a position corresponding to the arrangement of the page group in the partition information page.

As such, the remainder length R is calculated in the present embodiment based on the page size and the page spacing of the job entered. This may be configured such that one job corresponds to one page illustrated in FIG. 9, or such that a plurality of pages illustrated in FIG. 9 are printed in one job. When one job corresponds to one page, the page spacing D corresponds to the job interval.

According to the embodiments, as has been described above, a position at which a blank label can be printed is specified in a partition information page, and a QR code is printed thereon. Such a configuration allows for appropriately printing a QR code presenting a cutting position even on the print medium including a region such as a paper liner on which printing is impossible.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-018844, filed Feb. 9, 2022, which is hereby incorporated by reference herein in its entirety.

What is claimed is:

1. An image forming apparatus comprising:
at least one processor and at least one memory coupled to the at least one processor and having instructions stored therein and executable by the at least one processor, the at least one processor and at least one memory functioning as a setting unit configured to set a partition region for dividing a rolled print medium into a plurality of rolls, the partition region being set within a group of images that are sequentially printed accompanying feeding from a feeding apparatus in which the rolled print medium is set; and
a printing unit configured to print, on the print medium fed from the feeding apparatus, the group of images reflecting the partition region set by the setting unit, wherein
the printing unit prints, on the partition region, an identification image indicating a cutting position for dividing into the plurality of rolls,
the setting unit sets a position at which the identification image is printed, based on information of the group of images, and
the identification image indicates information of the partition region which includes at least one of a number of pages in a roll, a length of the roll, a partition length, and roll number information.

2. The image forming apparatus according to claim 1, wherein the setting unit sets the partition region based on a partition length in a feed direction.

3. The image forming apparatus according to claim 2, wherein the setting unit sets the position at which the identification image is printed based on information of the group of images and the partition length.

4. The image forming apparatus according to claim 3, wherein the information of the group of images includes size of the images and spacing between the images.

5. The image forming apparatus according to claim 3, wherein the setting unit sets the position corresponding to an arrangement of the group of images in the partition region as a position at which the identification image is printed.

6. The image forming apparatus according to claim 5, wherein the setting unit sets the position at which the identification image is printed based on a result of division of the partition length by a sum of a length in the feed direction of an image included in the group of images and spacing between the images.

7. The image forming apparatus according to claim 1, wherein the position at which the identification image is printed is in the vicinity of the cutting position.

8. The image forming apparatus according to claim 1, wherein the identification image is a coded image.

9. The image forming apparatus according to claim 1, wherein the identification image is a two-dimensional barcode.

10. The image forming apparatus according to claim 1, wherein the group of images is a group of labels.

11. The image forming apparatus according to claim 1, wherein each image included in the group of images is a page specified by a job.

12. The image forming apparatus according to claim 1, wherein the print medium is constituted by including a paper liner.

13. A method, comprising:
setting a partition region for dividing a rolled print medium into a plurality of rolls, the partition region being set within a group of images that are sequentially printed accompanying feeding from a feeding apparatus in which the rolled print medium is set; and
printing, on the print medium fed from the feeding apparatus, the group of images reflecting the partition region that is set, wherein
an identification image indicating a cutting position for dividing into the plurality of rolls is printed in the partition region,
a position, at which the identification image is printed, is set based on information of the group of images, and
the identification image indicates information of the partition region which includes at least one of a number of pages in a roll, a length of the roll, a partition length, and roll number information.

* * * * *